United States Patent
Lai et al.

(10) Patent No.: US 11,879,407 B1
(45) Date of Patent: Jan. 23, 2024

(54) THROTTLE CONTROL SYSTEM AND METHOD OF OPERATION

(71) Applicants: WAL LOW CARBON TECHNOLOGY (BEIJING) COMPANY, Beijing (CN); WAL Fuel Systems USA Inc., Livonia, MI (US)

(72) Inventors: Yuxiao Lai, Livonia, MI (US); Xiankai Song, Livonia, MI (US)

(73) Assignees: WAL Fuel Systems USA Inc., Livonia, MI (US); WAL Low Carbon Technology (Anhui) Co., Ltd., Anhui (CN)

( * ) Notice: Subject to any disclaimer, the term of this patent is extended or adjusted under 35 U.S.C. 154(b) by 0 days.

(21) Appl. No.: 17/986,531

(22) Filed: Nov. 14, 2022

(51) Int. Cl.
  *F02D 41/14* (2006.01)
  *F02D 41/00* (2006.01)
  *F02D 9/10* (2006.01)
  *F02D 41/28* (2006.01)
  *F02D 9/02* (2006.01)

(52) U.S. Cl.
  CPC .......... *F02D 41/1404* (2013.01); *F02D 9/10* (2013.01); *F02D 41/0005* (2013.01); *F02D 41/28* (2013.01); *F02D 2009/0284* (2013.01); *F02D 2041/1432* (2013.01); *F02D 2041/281* (2013.01); *F02D 2041/286* (2013.01)

(58) Field of Classification Search
  CPC ........ F02D 9/10; F02D 41/1404; F02D 41/28; F02D 2009/0284; F02D 2041/1432; F02D 2041/281; F02D 2041/286
  See application file for complete search history.

(56) References Cited

U.S. PATENT DOCUMENTS 5,757,179 A * 5/1998 McCurley .............. G01D 5/145
324/207.2

FOREIGN PATENT DOCUMENTS

CN 109578156 B * 3/2021 .............. F02D 11/10
JP H10288052 A * 10/1998

OTHER PUBLICATIONS

J. Porrill et al. "Adaptive filters and internal models: Multilevel description of cerebellar function." Neural Networks 47 (2013) 134-149. (Year: 2013).*

(Continued)

*Primary Examiner* — Hung Q Nguyen
*Assistant Examiner* — Mark L. Greene
(74) *Attorney, Agent, or Firm* — Young Basile Hanlon & MacFarlane, P.C.

(57) ABSTRACT

A throttle control system for a vehicle includes a controller comprising at least one processor and at least one non-transitory computer-readable medium, a throttle valve movable between valve positions, an input sensor to transmit a target position, and a position sensor configured to detect an instantaneous disposition of the throttle valve at one of the valve positions. The controller executes instructions stored in the at least one non-transitory computer-readable medium. The controller receives the target position signal and the detected position signal. The processor compares the target position signal and the detected position signal to the instructions, selects an output signal, and transmits the output signal to the throttle valve. A first fuzzy control acceleration, a brake deceleration, and a second fuzzy control acceleration based on the output signal are applied to move of the throttle valve toward the target position.

15 Claims, 7 Drawing Sheets

(56) References Cited

OTHER PUBLICATIONS

Haugen, Finn. "State estimation with Kalman Filter." Kompendium for Kyb. 2 ved Høgskolen i Oslo, published online prior to Aug. 10, 2017. Accessed Jun. 20, 2023. http://techteach.no/fag/seky3322/0708/kalmanfilter/kalmanfilter.pdf (Year: 2017).*

* cited by examiner

| Current Movement | Close Throttle | | | | Open Throttle | | | |
|---|---|---|---|---|---|---|---|---|
| | Distance from Target Position = Far | Distance from Target Position = Approaching | Distance from Target Position = Near | Distance from Target Position = Very Close | Distance from Target Position = Very Close | Distance from Target Position = Near | Distance from Target Position = Approaching | Distance from Target Position = Far |
| Opening | Close quickly | Close slowly | Slow down | Rotate open | Rotate close | Accelerate down accordingly | Speed up | Speed up |
| Hold | | | Close slowly | Hold | Hold | Speed up | | |
| Closing | | | Accelerate up accordingly | Rotate open | Rotate close | Speed up | | |

*FIG. 2*

THROTTLE CONTROL SYSTEM AND METHOD OF OPERATION

TECHNICAL FIELD

This disclosure relates generally to the field of throttle control systems for a vehicle.

BACKGROUND

Many industries utilize throttle valves to regulate the flow of a fluid. One particular application is a fuel cell, which is an electrochemical device that combines hydrogen fuel with oxygen to produce electricity. The flow of the gaseous and/or liquid fluids must be regulated to ensure a chemical reaction occurs that produces the electricity. As such, the ability to accurately and quickly control the fluid flow is desirable.

SUMMARY

One aspect of the disclosure is a throttle control system for a vehicle that includes a controller comprising at least one processor and at least one non-transitory computer-readable medium and a throttle valve in electronic communication with the controller and movable between multiple valve positions. The throttle control system also includes an input sensor in electronic communication with the controller and configured to transmit a target position signal to the controller corresponding to a target position of the valve positions and a position sensor in electronic communication with the controller and configured to detect an instantaneous disposition of the throttle valve at one of the valve positions and transmit a detected position signal to the controller. The controller is configured to receive the target position signal and the detected position signal. The processor is programmed to execute instructions stored in the at least one non-transitory computer-readable medium to compare the target position signal and the detected position signal to the instructions in the at least one non-transitory computer-readable medium, select an output signal corresponding to the target position signal, the detected position signal, and an estimated velocity, and transmit the output signal to the throttle valve. The processor is also programmed to apply a first fuzzy control acceleration based on the output signal to the throttle valve to move the throttle valve toward the target position, apply a brake deceleration based on the output signal to the throttle valve to decelerate the movement of the throttle valve toward the target position, and apply a second fuzzy control acceleration based on the output signal to the throttle valve to accelerate the movement of the throttle valve toward the target position.

In some implementations of the throttle control system, the first fuzzy control acceleration is greater than the second fuzzy control acceleration.

In some implementations of the throttle control system, the output signal comprises a pulse width modulated signal.

In some implementations of the throttle control system, the position sensor is configured to detect an instantaneous disposition of the throttle valve at one of the valve positions and transmit a second detected position signal to the controller of the instantaneous disposition of the throttle valve at one of the valve positions after the second fuzzy control acceleration.

In some implementations of the throttle control system, the processor is programmed to compare the target position signal and the second detected position signal to the instructions in the at least one non-transitory computer-readable medium, select a second output signal corresponding to the target position signal, the second detected position signal, and an estimated velocity, transmit the second output signal to the throttle valve, and apply a jump control acceleration based on the second output signal to the throttle valve to accelerate the movement of the throttle valve toward the target position.

In some implementations of the throttle control system, the jump control acceleration is less than the first fuzzy control acceleration and less than the brake deceleration.

In some implementations of the throttle control system, the position sensor comprises a Hall effect sensor.

In some implementations of the throttle control system, the processor is programmed to apply a Kalman filter to the detected position signal to reduce noise from the position sensor and estimate a velocity of the throttle valve.

In some implementations of the throttle control system, the processor is programmed to analyze the output signal and the detected position signal with the Kalman filter and produce a filtered detected position signal.

In some implementations of the throttle control system, the processor is programmed to transmit a filtered second output signal to the throttle valve.

One aspect of the disclosure is a throttle control system for a vehicle that includes a controller comprising at least one processor and at least one non-transitory computer-readable medium and a throttle valve in electronic communication with the controller and movable between multiple valve positions. The throttle control system also includes an input sensor in electronic communication with the controller and configured to transmit a target position signal to the controller corresponding to a target position of the valve positions and a position sensor in electronic communication with the controller and configured to detect an instantaneous disposition of the throttle valve at one of the valve positions and transmit a detected position signal to the controller. The controller is configured to receive the target position signal and the detected position signal. The processor is programmed to execute instructions stored in the at least one non-transitory computer-readable medium to compare the target position signal and the detected position signal to the instructions in the at least one non-transitory computer-readable medium, select an output signal corresponding to the target position signal, the detected position signal, and an estimated velocity, and transmit the output signal to the throttle valve. The processor is also programmed to apply a first fuzzy control acceleration based on the output signal to the throttle valve to move the throttle valve toward the target position, apply a brake deceleration based on the output signal to the throttle valve to decelerate the movement of the throttle valve toward the target position, and apply a second fuzzy control acceleration, less than the first fuzzy control acceleration, based on the output signal to the throttle valve to accelerate the movement of the throttle valve toward the target position. The position sensor is configured to detect an instantaneous disposition of the throttle valve at one of the valve positions and transmit a second detected position signal to the controller of the instantaneous disposition of the throttle valve at one of the valve positions after the second fuzzy control acceleration. The processor is programmed to compare the target position signal and the second detected position signal to the instructions in the at least one non-transitory computer-readable medium, select a second output signal corresponding to the target position signal, the second detected position signal, and an estimated velocity, and transmit the second output signal to the throttle valve. The processor is also programmed to apply a jump control acceleration based on the second output signal to the throttle valve to accelerate the movement of the throttle valve toward the target position.

One aspect of the disclosure is a method of operating a throttle control system for a vehicle. The control system includes a controller comprising at least one processor and at least one non-transitory computer-readable medium, a throttle valve in electronic communication with the controller and movable between multiple valve positions, an input sensor in electronic communication with the controller, and a position sensor in electronic communication with the controller. The method includes transmitting a target position signal with the input sensor to the controller corresponding to a target position of the valve positions, detecting an instantaneous disposition of the throttle valve at one of the valve positions with the position sensor, transmitting a detected position signal from the throttle valve to the controller, and receiving the target position signal and the detected position signal with the controller. The method also includes comparing the target position signal and the detected position signal with the processor to the instructions in the at least one non-transitory computer-readable medium, selecting an output signal with the processor corresponding to the target position signal, the detected position signal, and an estimated velocity, and transmitting the output signal from the processor to the throttle valve. The method also includes applying a first fuzzy control acceleration based on the output signal to the throttle valve to move the throttle valve toward the target position, applying a brake deceleration based on the output signal to the throttle valve to decelerate the movement of the throttle valve toward the target position, and applying a second fuzzy control acceleration based on the output signal to the throttle valve to accelerate the movement of the throttle valve toward the target position.

In some implementations of the method, the first fuzzy control acceleration is greater than the second fuzzy control acceleration.

In some implementations of the method, the method further includes detecting an instantaneous disposition of the throttle valve at one of the valve positions with the position sensor after the second fuzzy control acceleration and transmitting a second detected position signal from the throttle valve to the controller.

In some implementations of the method, the method further includes comparing the target position signal and the second detected position signal with the processor to the instructions in the at least one non-transitory computer-readable medium, selecting a second output signal with the processor corresponding to the target position signal, the second detected position signal, and an estimated velocity, transmitting the second output signal from the processor to the throttle valve, and applying a jump control acceleration based on the second output signal to the throttle valve to accelerate the movement of the throttle valve toward the target position.

In some implementations of the method, the jump control acceleration is less than the first fuzzy control acceleration and less than the brake deceleration.

In some implementations of the method, the method further includes applying a Kalman filter with the processor to the detected position signal to reduce noise from the position sensor and estimate a velocity of the throttle valve.

In some implementations of the method, applying the Kalman filter to the detected position signal comprises analyzing the output signal and the detected position signal with the Kalman filter and producing a filtered detected position signal.

In some implementations of the method, the method further includes transmitting a filtered second output signal with the processor to the throttle valve.

In some implementations of the method, the output signal comprises a pulse width modulated signal.

BRIEF DESCRIPTION OF THE DRAWINGS

FIG. 2 is an example table pertaining to fuzzy controls of the throttle control system.

DETAILED DESCRIPTION

This disclosure is directed to throttle control systems for use in a vehicle. One particular application in a vehicle is a fuel cell, which is an electrochemical device that combines hydrogen fuel with oxygen to produce electricity that powers (among other things) electric motors which propel the vehicle. The flow of the hydrogen and the oxygen must be carefully regulated to ensure a complete chemical reaction occurs that produces the electricity. Traditional throttle control systems utilize PID controls to operate a throttle valve. The PID controls produce sub-optimal operation characteristics for operating the throttle valve, with the typical accuracy deviation of the movement being greater than 2 degrees and the response time being greater than 0.5 seconds. The throttle control systems described herein use a combination of fuzzy control accelerations and brake decelerations that are able to achieve improved accuracy deviations of approximately 1 degree and improved response times of approximately 0.15 seconds.

Figure 1:
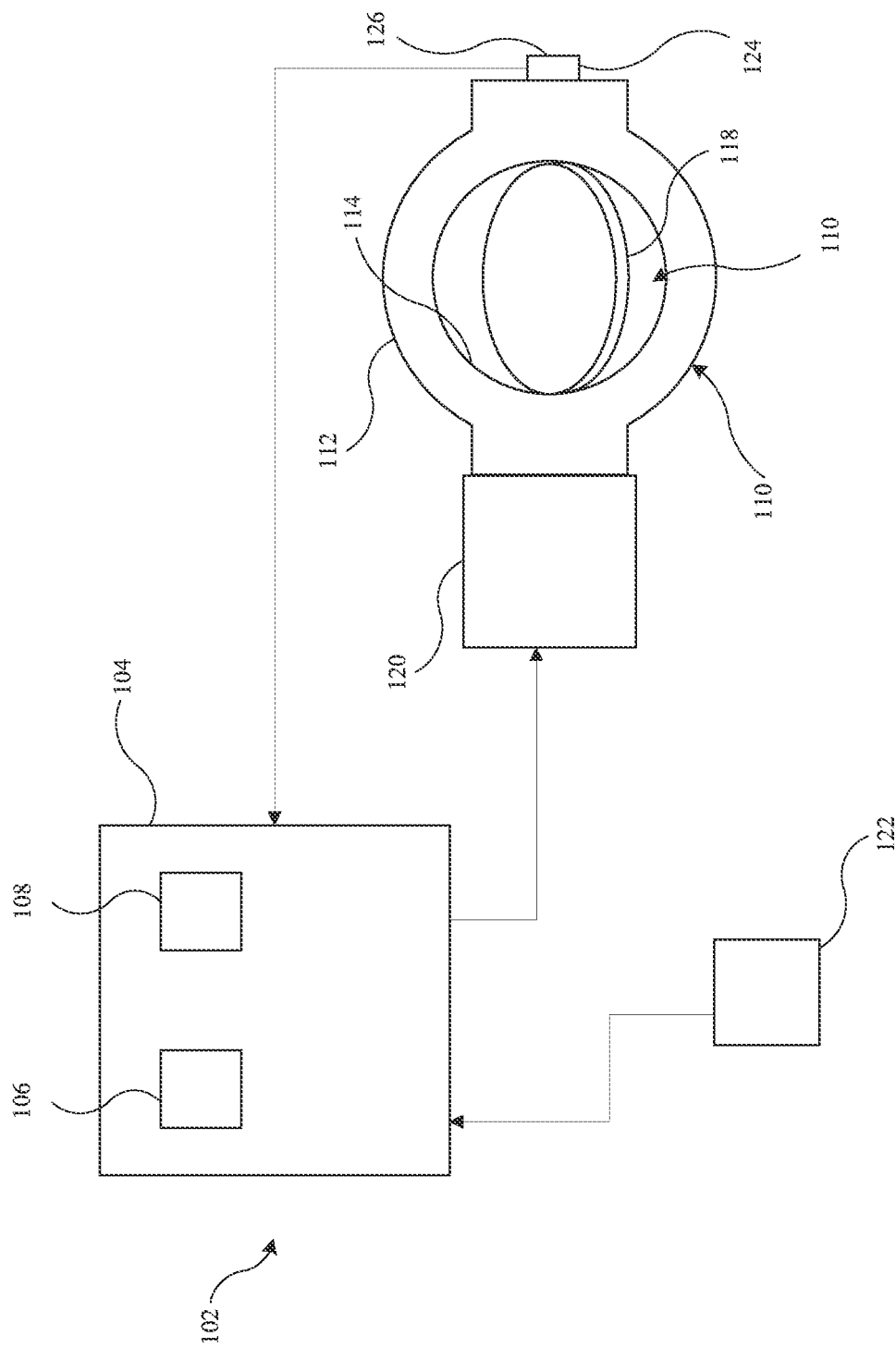
FIG. 1 is a schematic diagram of an example throttle control system.

FIG. 1 is a schematic illustration of a throttle control system 102 for a vehicle. The vehicle may be a road-going vehicle that is supported by wheels and is able to travel freely upon roadways and other surfaces. The throttle control system 102 is used to regulate the flow of a fluid. In one example, the throttle control system 102 is utilized in hydrogen fuel cell system to regulate the flow of hydrogen and/or oxygen. However, the throttle control system 102 may be utilized in other systems to regulate the flow of a fluid, such as in a throttle body that regulates the flow of air into an internal combustion engine.

The throttle control system 102 includes a controller 104 comprising at least one processor 106 and at least one non-transitory computer-readable medium 108. The at least one non-transitory computer-readable medium 108 may include other data such as control logic, software applications, instructions, computer code, data, lookup tables, etc. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. The non-transitory computer readable medium 108 may include media where data can be permanently stored and media where data can be stored and later overwritten, such as a rewritable optical disc or an erasable memory device. Computer code includes any type of program code, including source code, object code, and executable code. The processor 106 is configured to execute the code or instructions.

The throttle control system 102 further includes a throttle valve 110 in electronic communication with the controller 104 and movable between multiple valve positions. In the implementation shown in FIG. 1, the throttle valve 110 is configured as a butterfly valve having a body 112 that includes a seat 114 that defines an opening 116 that is substantially cylindrical and a plate 118 that is substantially circular pivotally disposed within the opening 116. One of the valve positions may be further defined as a fully closed position in which the plate 118 covers the most surface area of the opening 116 and a fully open position in which the plate 118 covers the least surface area of the opening 116. In the fully closed position, the throttle valve 110 permits the least amount fluid flow therethrough while in the fully open position the throttle valve 110 permits the most amount of fluid flow therethrough. The plate 118 may rotate to valve positions between the fully open position and the fully closed position for adjusting (i.e., throttling) the flow rate of the fluid through the opening 116. Although the throttle valve 110 shown in FIG. 1 is a butterfly valve, any suitable configuration may be used, such as a ball valve, a needle valve, etc.

The throttle valve 110 in FIG. 1 includes an electronic device 120 for rotating the plate 118. The electronic device 120 shown is an electric motor. However, any suitable electronic device 120 may be utilized for moving the plate 118, including (but not limited to) a servo, a solenoid, and a relay.

The throttle control system 102 also includes an input sensor 122 in electronic communication with the controller 104 and configured to transmit a target position signal to the controller 104 corresponding to a target position of the valve positions. In one implementation, the input sensor 122 is operatively coupled to an accelerator pedal that is configured to be manipulated by an operator of the vehicle. The accelerator pedal is manipulated (i.e., moved) by the operator between multiple input positions. The input positions individually correspond to the valve positions. The operator moves the accelerator pedal to one of the input positions. The selected input position in-turn designates the corresponding valve position as the target position and the input sensor 122 sends the target position signal to the controller 104. Although the input sensor 122 is shown to be operatively coupled to the accelerator pedal, any suitable mechanism may be utilized to be manipulated by the operator, including (but not limited to) a touchscreen, a knob, a lever, a switch, and a toggle. Furthermore, manipulation of the accelerator pedal or like device by an operator may be omitted and activation of the input sensor 122 may be automated. More specifically, the input sensor 122 may react to some other condition that is not manipulated by the operator (such as temperature of the fluid, pressure of the fluid, a designated time parameter, etc.) and transmit the target position signal to the controller 104.

The throttle control system 102 also includes a position sensor 124 in electronic communication with the controller 104 and configured to detect an instantaneous disposition of the throttle valve 110 at one of the valve positions and transmit a detected position signal to the controller 104. In the implementation shown in FIG. 1 the instantaneous disposition of the throttle valve 110 at one of the valve positions refers to the position of the plate 118 within the opening 116 of the body 112. However, the position sensor 124 may be utilized with other configurations of the throttle valve 110 not shown herein to detect the instantaneous disposition of the throttle valve 110 at one of the valve positions.

In one implementation, the position sensor 124 continuously detects the instantaneous disposition of the throttle valve 110 at one of the valve positions and continuously transmits the detected position signal to the controller 104. The term "continuously" in this example may refer to continuous cycling of detection and transmission by the position sensor 124 (i.e., detect and transmit repeated sequentially) with the rate of cycling determined by the processing speed of the controller 104. The controller 104 then determines whether any of the position signals require further analysis (as described in detail below). In another implementation, the position sensor 124 detects the instantaneous disposition of the throttle valve 110 at one of the valve positions and transmits the detected position signal when directed to by the controller 104 (i.e., when the instantaneous disposition of the throttle valve 110 at one of the valve positions for further analysis as described in detail below).

In the implementation shown in FIG. 1, the position sensor 124 comprises a Hall effect sensor 126, which detects the presence and magnitude of magnetic field using the Hall effect. However, any suitable position sensor may be utilized.

The controller 104 is configured to receive the target position signal and the detected position signal. The processor 106 is programmed to execute instructions stored in the at least one non-transitory computer-readable medium to compare the target position signal and the detected position signal to the instructions in the at least one non-transitory computer-readable medium 108, select an output signal corresponding to the target position signal, the detected position signal, and an estimated velocity, and transmit the output signal to the throttle valve 110. The output signal causes the throttle valve 110 to move toward the target position. More specifically, the processor 106 is programmed to apply a first fuzzy control acceleration based on the output signal to the throttle valve 110 to move the throttle valve 110 toward the target position, apply a brake deceleration based on the output signal to the throttle valve 110 to decelerate the movement of the throttle valve 110 toward the target position, and apply a second fuzzy control acceleration based on the output signal to the throttle valve 110 to accelerate the movement of the throttle valve 110 toward the target position. The first fuzzy control acceleration and the second fuzzy control acceleration may correspond to a torque output of the electronic device 120 when the electronic device 120 is an electric motor. The output signal controls the torque responsible for moving the throttle valve 110 to the target position. When the throttle valve 110 is held in a position, the motor torque and load torque are assumed to be approximately balanced. The throttle control system 102 builds an estimation of the relationship between the target position signal and the acceleration of the throttle valve 110 so that the controller 104 has better knowledge about the throttle control system 102, allowing the controller 104 to calculate more accurate values. The comparison performed by the processor 106 of the target position signal and the detected position signal to the instructions in the at least one non-transitory computer-readable medium 108 may refer to a look-up table within the instructions. The look-up table may list pre-determined values for the first fuzzy control acceleration and the second fuzzy control acceleration that correspond to pre-determined values received by controller 104 for the target position signal and the detected position signal. The processor 106 may utilize kinematics to calculate the brake deceleration as well as the durations of the first fuzzy control acceleration, the brake deceleration, and the second fuzzy control acceleration. In another example, the comparison performed by the processor 106 of the target position signal and the detected position signal to the instructions in the at least one non-transitory computer-readable medium 108 may refer to calculations performed in real-time based upon the kinematics of the throttle valve 110. The processor 106 compares the values of the target position signal, the detected position signal, and the estimated velocity to the pre-determined values in the look-up table to transmit the output signal with the corresponding values for the first fuzzy control acceleration, brake deceleration, and second fuzzy control acceleration from the table.

In one implementation of the throttle control system 102, the output signal comprises a pulse width modulated signal. However, other signal protocols may be utilized.

The term "fuzzy control" refers to the use of fuzzy logic in generating system controls, which is a close-to-human-reasoning process in analyzing inputs to generate an output. Fuzzy controls compute an output based on how close the input(s) are to a condition. In the implementation described herein, the use of fuzzy controls analyzes the distance between the valve position and the target position and relative speed of the throttle valve 110 to maximize the rate at which throttle valve 110 moves to the target position. In particular, the first fuzzy control acceleration generally moves the throttle valve 110 as quick as possible toward the target position as constrained by the distance to therebetween in order to prevent overshooting the target position. Similarly, the brake deceleration is generally configured to reduce the speed of the throttle valve 110 as quickly as possible based upon the distance between the throttle valve 110 position and the target position and as close to the target position as possible to maximize distance traveled by the first fuzzy control acceleration without overshooting the target position. In addition to determining when to start applying the brake deceleration, the processor 106 may incorporate a solid threshold that commands the throttle valve 110 to apply the brake deceleration when the plate 118 is within 20 degrees of the target position. This acts as a back-up to ensure that braking occurs even if the processor 106 does not to determine an adequate application of the brake deceleration. The second fuzzy control acceleration is configured to smoothly move the throttle valve 110 the remaining distance to the target position. As such, the first fuzzy control acceleration is greater than the second fuzzy control acceleration. More specifically, the second fuzzy control acceleration finds a balanced point between motor and load torques. The motor typically stops rotating when the PWM signal is between 20 and 30. As such, the PWM signal for the second fuzzy control acceleration may be approximately 30. To avoid over-braking, the processor 106 may check whether the throttle position has reached a satisfactory slow mode condition. If the throttle valve 110 has slowed down and is close to the target position, the processor 106 will stop braking. One example of the fuzzy logic that may be utilized by the controller 104 is shown in the table in FIG. 2.

The position sensor 124 may be configured to detect an instantaneous disposition of the throttle valve 110 at one of the valve positions and transmit a second detected position signal (i.e., with the current position of the throttle valve 110) to the controller 104 of the instantaneous disposition of the throttle valve 110 at one of the valve positions after the second fuzzy control acceleration. A small steady state error may be observable to the processor 106. To decrease the error, the processor 106 is programmed to compare the target position signal and the second detected position signal to the instructions in the at least one non-transitory computer-readable medium 108, select a second output signal corresponding to the target position signal, the second detected position signal, and an estimated velocity, transmit the second output signal to the throttle valve 110, and apply a jump control acceleration based on the second output signal to the throttle valve 110 to accelerate the movement of the throttle valve 110 toward the target position. The jump control acceleration is less than the first fuzzy control acceleration and less than the brake deceleration. As such, the jump control acceleration generally produces a small sudden movement to move the throttle valve 110 the rest of the way to the target position.

Furthermore, the jump control acceleration fine tunes the disposition of the throttle valve 110 at the target position and then holds the PWM signal to keep the throttle valve 110 steady at the target position. More specifically, to decrease the steady state error of the fuzzy controls when the throttle valve 110 is within one degree of the target position, the jump control acceleration and a hold state are utilized. After the second fuzzy control acceleration, the steady state error is typically below 2 degrees. The jump control acceleration is applied through one PWM cycle, which brings the throttle valve 110 closer to the target position. To avoid a possible delay due to the fuzzy controls, the processor 106 may not go back to the fuzzy control algorithm after the jump control acceleration. The processor 106 may output a hold PWM state, where the PWM command is a constant equal to the PWM before the jump control acceleration was determined. The second fuzzy control acceleration already brings the throttle valve 110 to steady state before the jump control acceleration. Therefore, the hold PWM may be strong enough to maintain the throttle position without overshoot. If the throttle valve 110 drifts away from the target position (e.g., up to 2 degrees), the processor 106 may apply another jump control acceleration after storing a new PWM for the hold state to allow the throttle valve 110 to settle within one degree of the target position. If throttle valve 110 is greater than 2 degrees from the target position, the processor 106 may apply another fuzzy control acceleration that is similar to the second fuzzy control acceleration.

Figure 3:
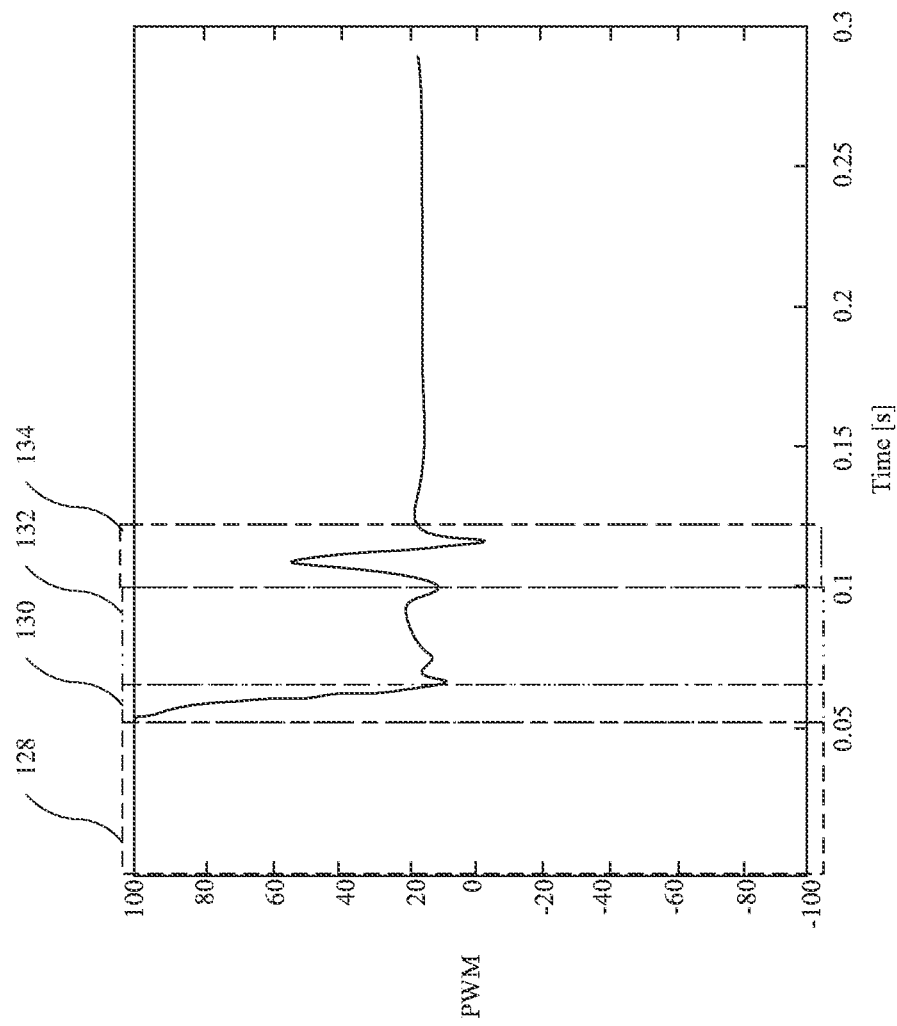
FIG. 3 is a line graph showing an example output signal over time.

FIG. 3 is line graph relating to an example implementation of the throttle control system 102. The line graph displays the strength of the output signal(s) configured as a PWM signal along the y-axis over time in seconds along the x-axis. The portion of the PWM signal corresponding to the first fuzzy control acceleration is shown within the box labeled 128. The portion of the PWM signal corresponding to the brake deceleration is shown within the box labeled 130. The portion of the PWM signal corresponding to the second fuzzy control acceleration is shown within the box labeled 132. The portion of the PWM signal corresponding to the jump control acceleration is shown within the box labeled 134. As demonstrated in the line graph, the PWM signal is the highest for the first fuzzy control acceleration, followed by a rapid decrease during the brake deceleration, followed by the second fuzzy control acceleration having a relatively steady PWM signal over time, and followed by sudden rapid increase in the PWM signal corresponding to the jump control acceleration.

Figure 4:
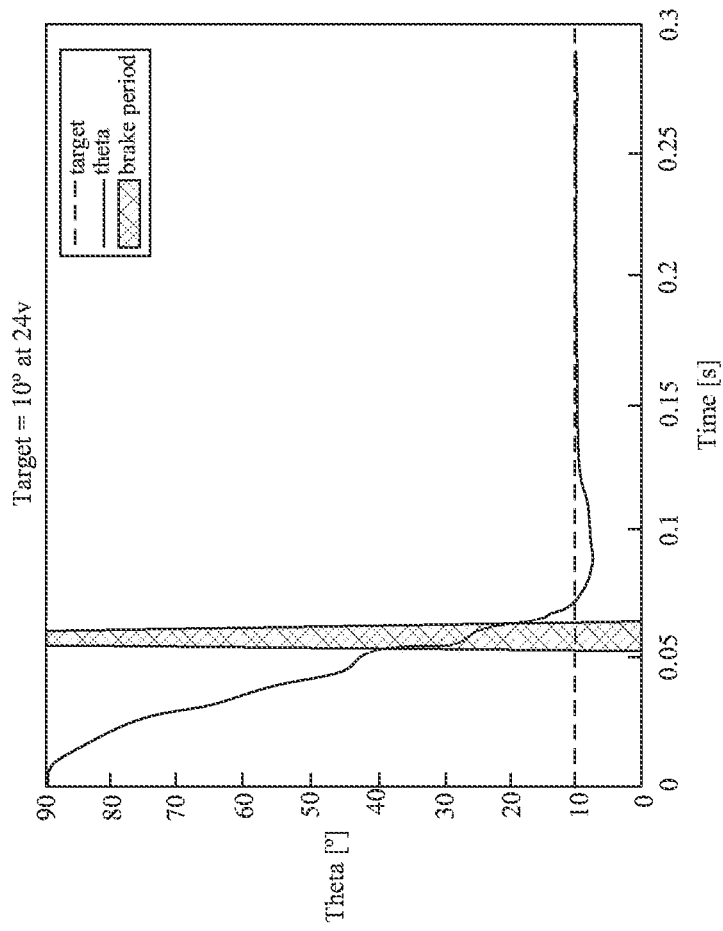
FIG. 4 is a line graph of showing one example of a change in a throttle position of a throttle valve of the throttle control system over time.

FIG. 4 is line graph relating to an example implementation of the throttle control system 102. The line graph displays the angular position of the throttle valve 110 in degrees along the y-axis over time in seconds along the x-axis. The line graph shows that the throttle valve 110 is capable of moving from approximately 90 degrees position to approximately 10 degrees position in approximately 0.15 seconds.

Figure 5:
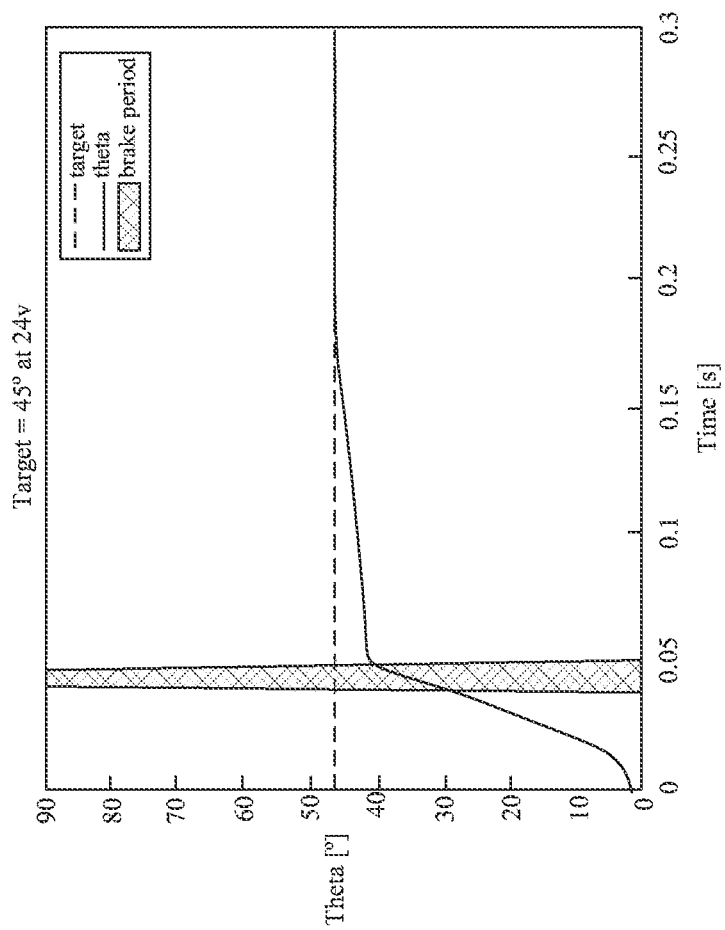
FIG. 5 is a line graph of showing another example of a change in the throttle position of the throttle valve of the throttle control system over time.

FIG. 5 is line graph relating to an example implementation of the throttle control system 102. The line graph displays the angular position of the throttle valve 110 in degrees along the y-axis over time in seconds along the x-axis. The line graph shows that the throttle valve 110 is capable of moving from approximately three degrees position to approximately 45 degrees position in approximately 0.15 seconds.

Figure 6:
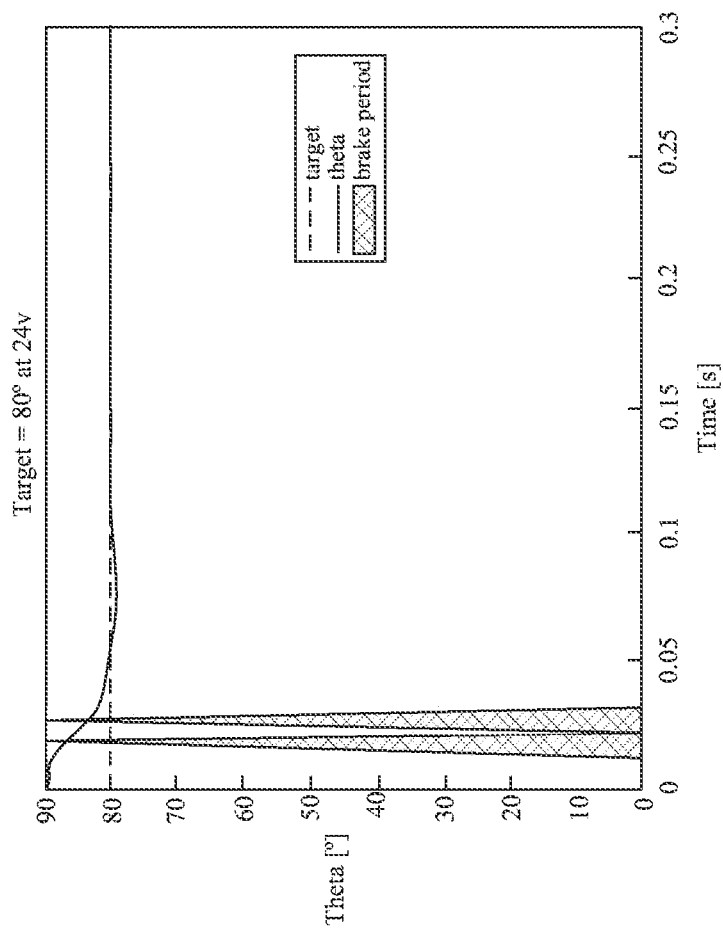
FIG. 6 is a line graph of showing another example of a change in the throttle position of the throttle valve of the throttle control system over time.

FIG. 6 is line graph relating to an example implementation of the throttle control system 102. The line graph displays the angular position of the throttle valve 110 in degrees along the y-axis over time in seconds along the x-axis. The line graph shows that the throttle valve 110 is capable of moving from approximately 90 degrees position to approximately 80 degrees position in approximately 0.07 seconds. Moreover, FIG. 6 demonstrates that more than one of the first fuzzy control acceleration, the brake deceleration, the second fuzzy control acceleration, and the jump control acceleration may be applied to the throttle valve 110 and in any suitable order. For example, FIG. 6 shows two brake decelerations applied to the throttle valve 110.

The processor 106 may be programmed to apply a Kalman filter to the detected position signal and the second detected position signal to reduce noise from the position sensor 124 and estimate a velocity of the throttle valve 110. For example, when the position sensor 124 is the Hall effect sensor 126, the detected position signal, the second detected position signal, etc. are voltage signals that are read by the processor 106 using an analog-to-digital converter (ADC). Both the position sensor 124 and the ADC may be affected by noise caused by reference voltage and heat, which can affect the accuracy and smoothness of the detected position, corresponding velocity, etc. The Kalman filter finds a balanced true estimation between predicted state and a measurement state. The Kalman filter is able to detect a large state change without drifting too far away from the measurements.

The Kalman filter is optimized when a state is held at a certain value. As such, the processor 106 is programmed to analyze the output signal and the detected position signal with the Kalman filter and produce a filtered detected position signal (i.e., a smooth position signal). Likewise, the processor 106 is programmed to analyze the output signal and the second detected position signal with the Kalman filter and produce a filtered second detected position signal (i.e., a smooth position signal). Applying the Kalman filter to these measurements results in a smaller standard deviation that allows the calculation of velocity to be smoother than taking the derivative of the measurements. The processor 106 is programmed to transmit the filtered output signal (or filtered second output signal) to the throttle valve 110, which applies the jump control acceleration as described above. The processor 106 may be further programmed to determine an interpolated velocity of the throttle valve 110 from the filtered detected position and/or the filtered second detected position produced by the Kalman filter to further reduce noise from the position sensor 124 and establish a more accurate determination of the position and velocity of the throttle valve 110.

The throttle control system 102 may be utilized within a range of power. In one example, the acceptable range of power is between 18V and 32V. However, any range of power may be utilized as the PWM may be scaled based on power voltage.

Figure 7:
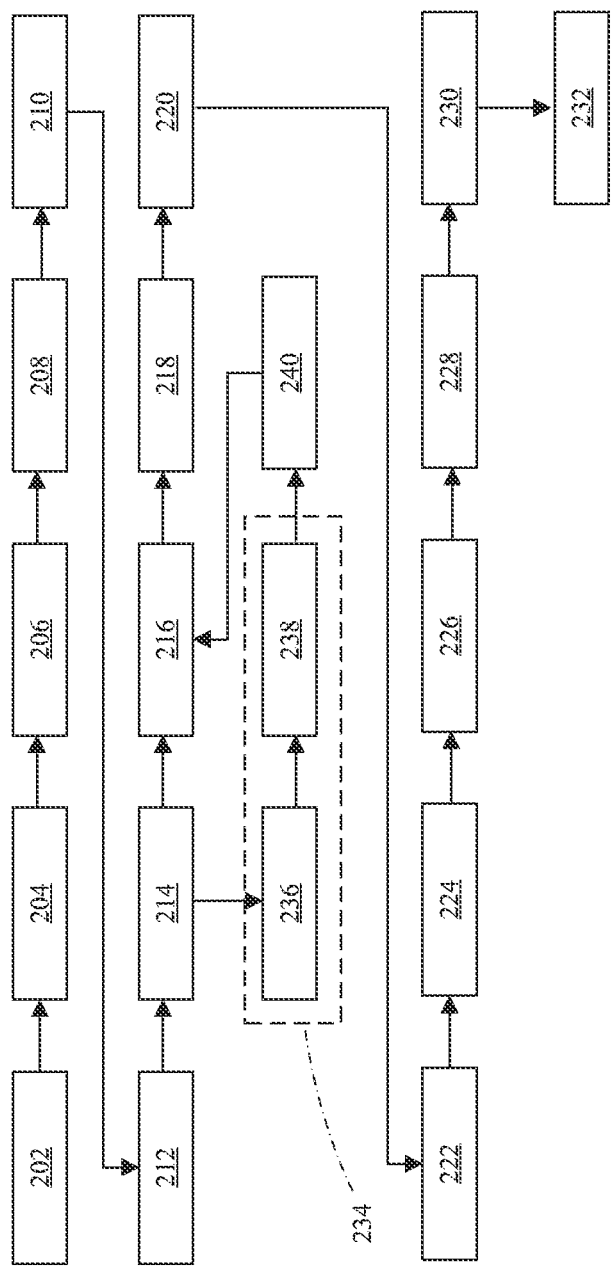
FIG. 7 is flow diagram for an example method of operating the throttle control system.

A method 200 of operating the throttle control system 102 is also disclosed herein and shown in FIG. 7. The method includes transmitting the target position signal with the input sensor 122 to the controller 104 corresponding to the target position of the valve positions (see box 202), detecting the instantaneous disposition of the throttle valve 110 at one of the valve positions with the position sensor 124 (see box 204), transmitting the detected position and from the throttle valve 110 to the controller 104 (see box 206), and receiving the target position signal and the detected position signal with the controller 104 (see box 208). The method also includes comparing the target position signal and the detected position signal with the processor 106 to the instructions in the at least one non-transitory computer-readable medium 108 (see box 210), selecting the output signal with the processor 106 corresponding to the target position signal, the detected position signal, and an estimated velocity (see box 212), and transmitting the output signal from the processor 106 to the throttle valve 110 (see box 214). The method also includes applying the first fuzzy control acceleration based on the output signal to the throttle valve 110 to move the throttle valve 110 toward the target position (see box 216), applying the brake deceleration based on the output signal to the throttle valve 110 to decelerate the movement of the throttle valve 110 toward the target position (see box 218), and applying the second fuzzy control acceleration based on the output signal to the throttle valve 110 to accelerate the movement of the throttle valve 110 toward the target position (see box 220). As described above, the first fuzzy control acceleration may be greater than the second fuzzy control acceleration and the output signal may comprise the pulse width modulated signal.

The method may further include detecting the instantaneous disposition of the throttle valve 110 at one of the valve positions with the position sensor 124 (see box 222) after the second fuzzy control acceleration (see box 220) and transmitting the second detected position signal from the throttle valve 110 to the controller 104 (see box 224). The method may also include comparing the target position signal and the second detected position signal with the processor 106 to the instructions in the at least one non-transitory computer-readable medium 108 (see box 226), selecting the second output signal with the processor 106 corresponding to the target position signal, the second detected position signal, and an estimated velocity (see box 228), transmitting the second output signal from the processor 106 to the throttle valve 110 (see box 230), and applying the jump control acceleration based on the second output signal to the throttle valve 110 to accelerate the movement of the throttle valve 110 toward the target position (see box 232). As described above, the jump control acceleration is less than the first fuzzy control acceleration and less than the brake deceleration.

The method may further include applying the Kalman filter with the processor 106 to the detected position signal to reduce noise from the position sensor 124 and estimate a velocity of the throttle valve 110 (see box 234). More specifically, applying the Kalman filter to the detected position signal (see box 234) may comprise analyzing the output signal and the detected position signal with the Kalman filter (see box 236) and producing the filtered detected position signal (see box 238). The method may further include transmitting the filtered output signal with the processor 106 to the throttle valve 110 (see box 240). The Kalman Filter and control logic may operate on different frequencies. The Kalman filter may operate at a higher rate than the control logic. Therefore, the Kalman filter may operate before the control logic is initiated. In this situation, the Kalman filter assumes the output signal to be zero. As such, the steps of applying the Kalman filter with the processor 106 to the detected position signal to reduce noise from the position sensor 124 (see box 234) and transmitting the filtered output signal with the processor 106 to the throttle valve 110 (see box 240) may be performed between the steps of receiving the target position signal and the detected position signal with the controller 104 (see box 208) and comparing the target position signal and the detected position signal with the processor 106 to the instructions in the at least one non-transitory computer-readable medium 108 (see box 210).

The words "example" or "implementation" are used herein to illustrate an example, instance, or illustration, and is not necessarily to be construed as preferred or advantageous over other aspects or designs. The term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

While implementations have been illustrated and described, it will be appreciated that various changes can be made therein without departing from the spirit and scope of the disclosure. Moreover, the various features of the implementations described herein are not mutually exclusive. Rather any feature of any implementation described herein may be incorporated into any other suitable implementation. If the concept and technical scheme of the disclosure are directly applied to other occasions, they all fall within the protection scope of the present disclosure.

What is claimed is:

1. A throttle control system for a vehicle, the throttle control system comprising:
   a controller comprising at least one processor and at least one non-transitory computer-readable medium;
   a throttle valve in electronic communication with the controller and movable between multiple valve positions;
   an input sensor in electronic communication with the controller and configured to transmit a target position signal to the controller corresponding to a target position of the valve positions; and
   a position sensor in electronic communication with the controller and configured to detect an instantaneous disposition of the throttle valve at one of the valve positions and transmit a detected position signal to the controller;
   wherein the controller is configured to receive the target position signal and the detected position signal, and the processor is programmed to execute instructions stored in the at least one non-transitory computer-readable medium to:
      compare the target position signal and the detected position signal to the instructions in the at least one non-transitory computer-readable medium;
      select an output signal corresponding to the target position signal, the detected position signal, and an estimated velocity;
      transmit the output signal to the throttle valve;
      apply a first fuzzy control acceleration based on the output signal to the throttle valve to move the throttle valve toward the target position;
      apply a brake deceleration based on the output signal to the throttle valve to decelerate the movement of the throttle valve toward the target position;
      apply a second fuzzy control acceleration based on the output signal to the throttle valve to accelerate the movement of the throttle valve toward the target position, wherein the position sensor is configured to detect an instantaneous disposition of the throttle valve at one of the valve positions and transmit a second detected position signal to the controller of the instantaneous disposition of the throttle valve at one of the valve positions after the second fuzzy control acceleration;
      compare the target position signal and the second detected position signal to the instructions in the at least one non-transitory computer-readable medium;
      select a second output signal corresponding to the target position signal, the second detected position signal, and an estimated velocity;
      transmit the second output signal to the throttle valve; and
      apply a jump control acceleration based on the second output signal to the throttle valve to accelerate the movement of the throttle valve toward the target position.

2. The throttle control system of claim 1, wherein the first fuzzy control acceleration is greater than the second fuzzy control acceleration.

3. The throttle control system of claim 1, wherein the output signal comprises a pulse width modulated signal.

4. The throttle control system of claim 1, wherein the jump control acceleration is less than the first fuzzy control acceleration and less than the brake deceleration.

5. The throttle control system of claim 1, wherein the position sensor comprises a Hall effect sensor.

6. The throttle control system of claim 1, wherein the processor is programmed to transmit a filtered second output signal to the throttle valve by applying a Kalman filter to the second detected position signal, wherein the filtered second output signal is selected corresponding to the target position signal, the filtered second detected position signal, and the estimated velocity.

7. The throttle control system of claim 1, wherein the processor is programmed to apply a Kalman filter to the detected position signal to reduce noise from the position sensor and estimate a velocity of the throttle valve.

8. The throttle control system of claim 7, wherein the processor is programmed to analyze the output signal and the detected position signal with the Kalman filter and produce a filtered detected position signal.

9. A method of operating a throttle control system for a vehicle, the control system comprising a controller comprising at least one processor and at least one non-transitory computer-readable medium, a throttle valve in electronic communication with the controller and movable between multiple valve positions, an input sensor in electronic communication with the controller, and a position sensor in electronic communication with the controller; the method comprising:

- transmitting a target position signal with the input sensor to the controller corresponding to a target position of the valve positions;
- detecting an instantaneous disposition of the throttle valve at one of the valve positions with the position sensor;
- transmitting a detected position signal from the throttle valve to the controller;
- receiving the target position signal and the detected position signal with the controller;
- comparing the target position signal and the detected position signal with the processor to the instructions in the at least one non-transitory computer-readable medium;
- selecting an output signal with the processor corresponding to the target position signal, the detected position signal, and an estimated velocity;
- transmitting the output signal from the processor to the throttle valve;
- applying a first fuzzy control acceleration based on the output signal to the throttle valve to move the throttle valve toward the target position;
- applying a brake deceleration based on the output signal to the throttle valve to decelerate the movement of the throttle valve toward the target position; and
- applying a second fuzzy control acceleration based on the output signal to the throttle valve to accelerate the movement of the throttle valve toward the target position, wherein the method further comprises:
- detecting an instantaneous disposition of the throttle valve at one of the valve positions with the position sensor after the second fuzzy control acceleration; and
- transmitting a second detected position signal from the throttle valve to the controller, wherein the method further comprises:
- comparing the target position signal and the second detected position signal with the processor to the instructions in the at least one non-transitory computer-readable medium;
- selecting a second output signal with the processor corresponding to the target position signal, the second detected position signal, and an estimated velocity;
- transmitting the second output signal from the processor to the throttle valve; and
- applying a jump control acceleration based on the second output signal to the throttle valve to accelerate the movement of the throttle valve toward the target position.

10. The method of claim 9, wherein the first fuzzy control acceleration is greater than the second fuzzy control acceleration.

11. The method of claim 9, wherein the jump control acceleration is less than the first fuzzy control acceleration and less than the brake deceleration.

12. The method of claim 9, further comprising applying a Kalman filter with the processor to the detected position signal to reduce noise from the position sensor and estimate a velocity of the throttle valve.

13. The method of claim 12, wherein applying the Kalman filter to the detected position signal comprises analyzing the output signal and the detected position signal with the Kalman filter and producing a filtered detected position signal.

14. The method of claim 13, further comprising transmitting a filtered second output signal with the processor to the throttle valve.

15. The method of claim 9, wherein the output signal comprises a pulse width modulated signal.

\* \* \* \* \*